Patented Mar. 12, 1946

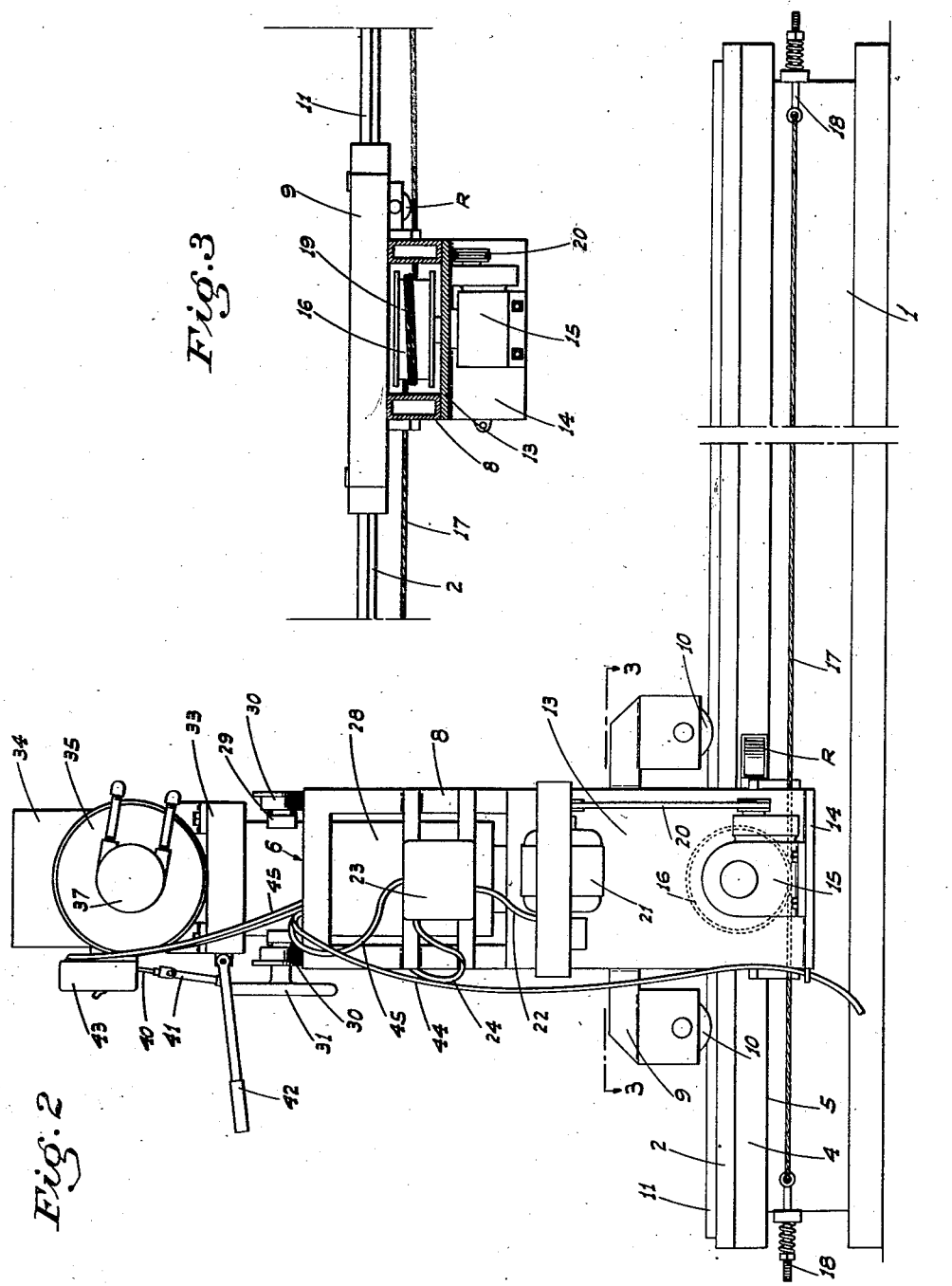

2,396,496

UNITED STATES PATENT OFFICE 2,396,496

WORK STRAIGHTENING PRESS

Orville L. Dubie, Toccoa, Ga., assignor to R. G. Le Tourneau, Inc., Stockton, Calif., a corporation of California Application July 13, 1943, Serial No. 494,574

8 Claims. (Cl. 153—52)

This invention is directed to, and it is an object to provide, a power actuated press which includes a ram disposed with its axis vertical and mounted above a work table for lengthwise and traversing movement relative to said table; said ram including a vertical plunger operative to engage and straighten a warped plate or structural assembly disposed on the work table, and which straightening may be necessary preparatory to use of the plate or assembly in the fabrication of a steel structure. For example, in the manufacture of heavy-duty earth working equipment, such as carrying scrapers, the side assemblies are prefabricated from steel plates and beams by welding, and which welding may cause some warping of the assembly. It is for the purpose of correcting or straightening such a warp that the present invention is designed.

Another object of this invention is to provide a work straightening press which comprises a horizontal work table adapted for reception of work to be straightened, a bridge extending across the work table and mounted for movement lengthwise of the latter, a carriage mounted on top of said bridge for movement transversely relative to the work table, a hydraulic ram mounted in connection with and depending toward the work table from the carriage, the ram including a downwardly projecting plunger, manually controlled means operative to selectively cause movement of said bridge lengthwise of the work table or said carriage transversely of the work table, and other manually controlled means operative to cause vertical actuation of the plunger.

A further object is to provide a press, as in the preceding paragraph, in which the assembly of the carriage and hydraulic ram includes a horizontal platform upon which is mounted a motor-driven, valve controlled, fluid pressure supply system; said system including a fluid supply reservoir, an electric motor, a pump driven by the latter, a hand controlled valve, and a fluid conduit arrangement including a pair of supply pipes leading to opposite ends of the ram.

An additional object of the invention is to provide a press of the type described which includes novel drive means to effect movement of the aforesaid bridge lengthwise of the work table; said drive means comprising a cable secured at its ends in connection with and extending alongside the work table, and a reversibly driven drum mounted on one side of the bridge adjacent said cable, the cable intermediate its ends being wound about the drum whereby, upon rotation of said drum in one direction or the other, to cause movement of the bridge lengthwise of said table in a corresponding direction.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a side elevation of the press, foreshortened.

Figure 3 is a fragmentary cross section on line 3—3 of Fig. 2.

Figure 1:
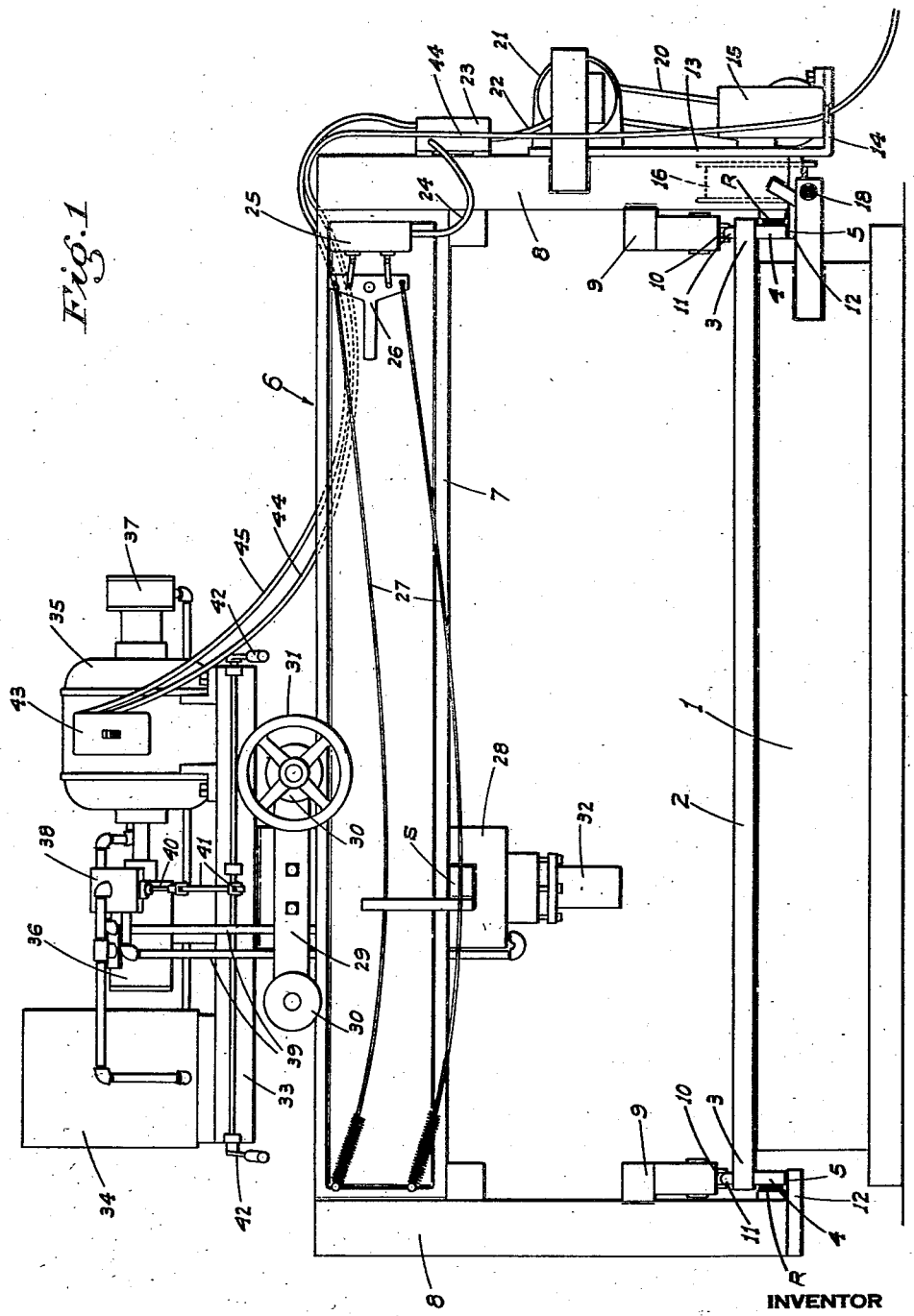
Figure 1 is an end elevation of the press.

Referring now more particularly to the characters of reference on the drawings, the press comprises a floor-supported bed 1 which includes a work table 2, said work table being flat, rectangular in plan, and at opposite sides projects beyond corresponding sides of the bed, as at 3. Rigid depending flanges 4 are secured to the projecting side portions 3 of the work table, and the lower edges of said flanges 4 provide downwardly facing horizontal stop shoulders 5, whose purpose will hereinafter appear.

An inverted U-shaped bridge 6 spans the work table from side to side, said bridge comprising spaced parallel top beams 7 connected in unitary relation supported at the ends by post units 8; said post units extending downwardly in clearance relation to the side portions 3 of the work table to a termination a short distance therebelow.

Each post unit 8 intermediate its ends is fitted with a wheel truck which includes a beam 9 of substantially greater length than the width of the units, and extending lengthwise of the table 2 in overhanging relation to portions 3 thereof. Grooved wheels 10 are mounted in connection with the outer ends of beams 9, which wheels ride upon rails 11 secured to the top of the work table in parallel relation and adjacent the side edges thereof. As the wheels 10 of each truck are relatively widely spaced and are disposed on opposite sides of the corresponding post unit, the bridge is stabilized and yet is movable lengthwise of the work table. Lateral rollers R mounted on the post units 8 engage the outer faces of flanges 4.

Stop fingers 12 are fixed on the lower ends of the post units 8 and project horizontally inwardly in closely underlying relation to the shoulders 5 of flanges 4. By reason of this arrangement the bridge 6 cannot elevate relative to the work table and yet is not restricted in its movement lengthwise of said table.

The bridge 6 is power driven lengthwise of the work table by the following arrangement:

One of the post units 8 is formed on the outside and adjacent its lower end with a supporting frame 13 which includes an outwardly projecting horizontal step 14 on which is mounted a reduction gear box 15, which in turn supports a cable drum 16 on an axis slightly below the work table and extending in a direction transversely thereof. The cable drum 16 is disposed close to but outwardly of the adjacent side of said work table. A generally horizontal cable 17 extends alongside the bed between tensioning bolts 18 at opposite ends thereof, and is disposed in a plane tangent to the bottom of the cable drum 16, said cable including a plurality of turns 19 wound about said drum. It will be seen that upon rotation of the drum 16 in one direction or the other, the bridge will be moved lengthwise of the work table in a corresponding direction. The gear reduction box 15 is driven by a belt 20 from a reversible electric motor 21 mounted on the frame 13 above said gear reduction box. Current is supplied to the motor 21 through a cable 22 which leads from a terminal box 23; another cable 24 leading from said terminal box to a reversing switch 25 which controls the operation of motor 21. The reversing switch 25 is mounted on the side and at the end of one of the top beams 7, actuated by a T-shaped lever 26 centrally pivoted adjacent the switch and connected therewith as shown. In order to permit an operator to work the switch 25 from any point on the work table, control cords 27 or similar flexible elements lead from the ends of lever 26 to connection at the opposite end of said top beam.

A double acting hydraulic ram 28 is disposed between the top beams 7 of bridge 6, and with its axis vertical; said ram being mounted in connection with and depending from a traversing carriage 29 which included flanged rollers 30 which ride atop beams 7 and prevent displacement of said carriage laterally of the bridge. A hand wheel 31 is mounted in connection with one of the roller axles and provides the means whereby the traversing carriage 29 may be moved along the bridge between opposite ends thereof. Stops S on the ram engage the under edge of beams 7 to prevent upward movement of the carriage and ram.

The hydraulic ram 28 includes a depending work engaging plunger 32, and the ram is actuated by the following arrangement, and which is supported entirely in connection with the ram and carriage assembly for movement therewith:

A horizontal platform 33 is fixed on the upper end of the ram 28 and supports a fluid reservoir 34, an electric motor 35, pumps 36 and 37 driven by said motor, a manually controlled valve 38, and a pipe system including supply pipes 39 which lead to opposite ends of the ram 28. The reservoir, pumps, and valve are so connected by the pipe system that the valve 38 controls flow of fluid under pressure selectively to the ends of the ram. The valve incorporates a movable control stem 40 which is actuated by a shaft and lever assembly 41 which includes hand levers 42 disposed at opposite ends of the carriage whereby to provide for easy access to the operator regardless of the position of the carriage on the bridge.

The electric motor includes a switch box 43 to which an electric supply cable 44 leads, said cable being looped or slack, as shown, to permit of the desired movement of the traversing carriage 29. The terminal box 23 is supplied with current from the switch box 43, which latter serves as a master switch, by another electric cable 45.

In operation, a steel plate or assembly which needs straightening at some point is placed on the work table 2, preferably supported with the point of warp disposed between a pair of supporting blocks. Thereafter the bridge and the traversing carriage 29 are operated by switch 25 and hand wheel 31, respectively, to bring the plunger 32 of ram 28 in position directly above said point of warp of the work. With the plunger so positioned one of the control levers 42 is manipulated in a direction to cause operation of the ram and downward advance of the plunger. This movement of the plunger is quite forceful and, upon engagement with the work, the plunger will bend the latter downwardly and straighten the warp requiring correction.

From the foregoing description it will be readily seen that I have produced such a device as substantially fulfills the objects of the invention as set forth herein.

While this specification sets forth in detail, the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A press comprising a work table, a bridge extending across said table, a ram including a vertically movable downwardly projecting plunger, the bridge being mounted on the work table for movement lengthwise thereof, the ram being mounted on the bridge for movement transversely of the work table, manually controlled means to selectively cause movement of said bridge lengthwise of the work table or movement of said ram transversely of the work table, and other manually controlled means operative to cause vertical actuation of the ram plunger; said first named means including a cable secured at its ends in connection with and extending alongside the work table, and a reversibly driven drum mounted on the bridge adjacent said cable, the cable intermediate its ends being wound about said drum.

2. A press comprising a work table, a bridge extending across said table, a ram including a vertically movable downwardly projecting plunger, the bridge being mounted on the work table for movement lengthwise thereof, a traversing carriage on the bridge the ram being mounted on said carriage for movement therewith transversely of the work table, manually controlled means to selectively cause movement of said bridge lengthwise of the work table or movement of said carriage transversely of the work table, a horizontal platform mounted in connection and for movement with the ram and carriage assembly, and a motor driven, valve controlled fluid pressure system supported on said platform and connected in operative relation to said ram.

3. A power press comprising a horizontal work table, a bridge extending across said table, the bridge including end post units depending therefrom, wheel trucks secured on said post units adjacent their lower ends, transversely spaced parallel rails on the work table, the wheel trucks riding said rails, a fixed cable extending along one side of the work table, a manually controlled, reversibly driven cable drum mounted on the corresponding post unit adjacent said cable, the cable intermediate its ends being wound about said drum, a manually controlled ram having a vertically movable downwardly projecting plunger, and means mounting the ram on the bridge for controlled movement therealong.

4. A power press comprising a horizontal work table, a bridge extending across said table, the bridge including end post units depending therefrom, wheel trucks secured on said post units adjacent their lower ends, transversely spaced parallel rails on the work table, the wheel trucks riding said rails, a fixed cable extending along one side of the work table, a manually controlled, reversibly driven cable drum mounted on the corresponding post unit adjacent said cable, the cable intermediate its ends being wound about said drum, a manually controlled ram having a vertically movable downwardly projecting plunger, means mounting the ram on the bridge for controlled movement therealong, and means operative without limiting lengthwise movement of the bridge, to prevent elevation of the latter relative to the work table.

5. A power press comprising a horizontal work table, a bridge extending across said table, the bridge including end post units depending therefrom, wheel trucks secured on said post units adjacent their lower ends, transversely spaced parallel rails on the work table, the wheel trucks riding said rails, a fixed cable extending along one side of the work table, a manually controlled, reversibly driven cable drum mounted on the corresponding post unit adjacent said cable, the cable intermediate its ends being wound about said drum, a manually controlled ram having a vertically movable downwardly projecting plunger, means including a traversing carriage mounting the ram on the bridge for controlled movement therealong, and means operative without limiting its movement along the bridge, to prevent elevation of the carriage relative to said bridge.

6. A power press comprising a work table, a bridge extending across said table, the bridge being mounted on the work table for controlled movement lengthwise of the latter, and against relative elevation, a vertical axis ram including a downwardly projecting plunger, the ram being mounted on the bridge for controlled movement therealong, and against relative elevation, and manually controlled means to cause actuation of the ram; the bridge including spaced parallel top beams, and the ram mounting means comprising a carriage supported by and movable along said beams, the ram being fixed to the carriage and depending between said beams, and a stop fixed on the ram and projecting in closely adjacent relation beneath one of said beams.

7. A power press comprising a work table, a bridge extending across said table, a downwardly projecting ram mounted on said bridge for controlled traversing movement relative to the work table, means mounting the bridge on the table for movement lengthwise thereof, and power actuated means to effect such movement of the bridge; said last named means including a reversible electric motor and a switch connected therewith, said motor and switch being mounted on the bridge for movement therewith; the bridge including a top beam, said switch being mounted adjacent one end of the beam, a double-ended switch operating lever mounted adjacent the switch, and flexible lever operating elements secured at one end to the ends of said lever and thence extending lengthwise of said beam to connection at the other ends with the opposite end of said beam.

8. A press comprising a work table, a bridge extending across the work table, said bridge being mounted for controlled movement lengthwise of the work table, and against relative elevation, and a hydraulic ram assembly including, in unitary relation, a power driven, valve controlled, fluid pressure supply system connected in operating relation to the ram, said ram assembly being mounted on the bridge for movement therealong, and against relative elevation, said ram assembly also including a valve control lever disposed adjacent opposite ends of said assembly and spaced transversely of the work table, and a common valve control shaft on the ends of which said levers are mounted.

ORVILLE L. DUBIE.